Figure 1:
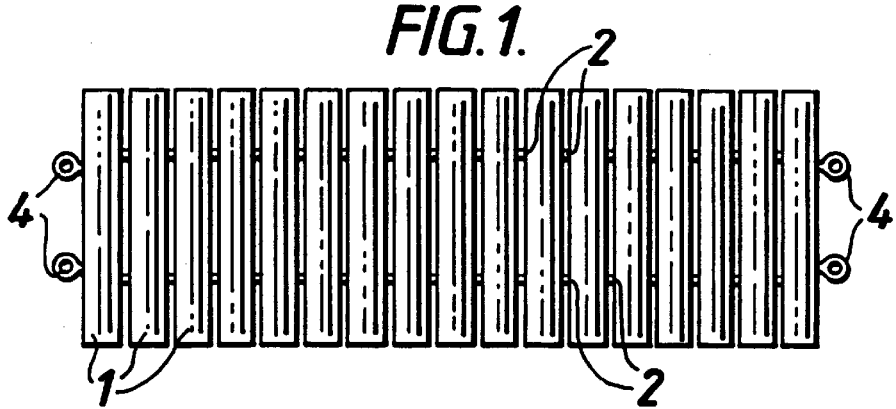

United States Patent [19]
Anderson

[11] Patent Number: 5,820,299
[45] Date of Patent: Oct. 13, 1998

[54] BUILDING MODULES AND ASSEMBLIES MADE FROM SUCH MODULES

[75] Inventor: John Muirhead Anderson, Falkirk, Great Britain

[73] Assignee: British Gas plc, London, England

[21] Appl. No.: 564,095

[22] PCT Filed: Jun. 14, 1994

[86] PCT No.: PCT/GB94/01283

§ 371 Date: Mar. 22, 1996

§ 102(e) Date: Mar. 22, 1996

[87] PCT Pub. No.: WO94/29624

PCT Pub. Date: Dec. 22, 1994

[30] Foreign Application Priority Data

Jun. 16, 1993 [GB] United Kingdom .................... 9312380

[51] Int. Cl.⁶ .................... F16L 1/24; E02B 3/12
[52] U.S. Cl. .................... 405/172; 405/17; 405/20; 52/403.1; 52/582.2; 52/223.7
[58] Field of Search .................... 405/16, 17, 19, 405/20, 172; 52/403.1, 582.2, 583.1, 223.7

[56] References Cited

U.S. PATENT DOCUMENTS

| | | | |
|---|---|---|---|
| 4,375,928 | 3/1983 | Crow et al. | 405/20 |
| 4,564,311 | 1/1986 | Scales | 405/20 |
| 4,664,552 | 5/1987 | Schaaf | 405/20 |
| 4,683,156 | 7/1987 | Waters | 405/20 X |

FOREIGN PATENT DOCUMENTS

| | | |
|---|---|---|
| 0 214 753 | 3/1987 | European Pat. Off. . |
| 2 178 127 | 2/1987 | United Kingdom . |

Primary Examiner—Christopher Kent
Assistant Examiner—Yvonne Horton-Richardson
Attorney, Agent, or Firm—Larson & Taylor

[57] ABSTRACT

Each module includes a tubular member filled with filling material, such as concrete, and a tube located in the filling material and extending longitudinally of the tubular member. Tubes or holes extend transversely through the tubular member and the filling material. The longitudinal tube facilitates connection of the module in end-to-end relationship with the modules using connecting mechanisms. The transverse tubes or holes facilitate securing the module to one or more like modules in side-by-side relationship using securing mechanisms. The modules may be assembled together so as to form, for example, a pipeline stabilizing and protection mat to ballast and protect underwater pipelines.

17 Claims, 2 Drawing Sheets

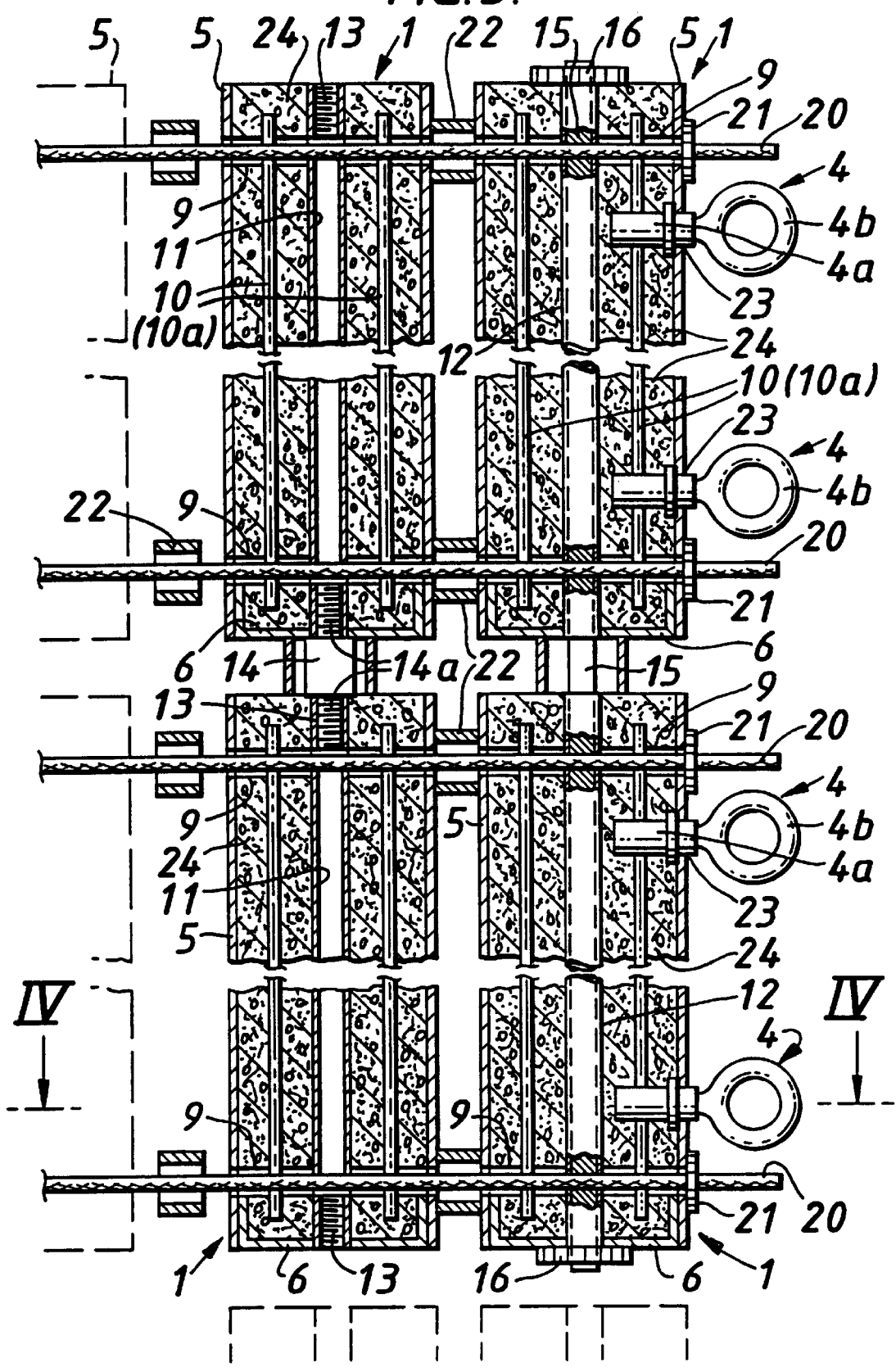

BUILDING MODULES AND ASSEMBLIES MADE FROM SUCH MODULES

This invention relates to building modules and building assemblies constructed from such modules such as stabilising and protection mats used to ballast and protect underwater installations, particularly, gas or oil pipelines on the sea bed or river bed.

It is known that such mats may comprise a plurality of elongate cast concrete bars disposed in side-by-side spaced relationship with each other and connected together by flexible connectors so as in use to enable the flexible mat to be draped over or against a pipeline (usually with the assistance of divers) with its ends resting on the sea or river bed at either or both sides of the pipeline. In practice, a number of these mats are draped at intervals along a length of the pipeline considered in need of ballasting and protection particularly from the undesirable effects of erosion of the sedimentary bed, scouring, and damage sometimes caused by trawler line tackle and the dragging of ships anchors or anchor cables which can result in the loss of areas of concrete coating usually applied to the exterior surfaces of a pipeline.

Known mats of the kind referred to above have been found to be very expensive since they require significant amounts of capital investment, time and labour in providing and setting up moulds or shuttering which have to be retained during at least partial curing of the concrete. Also additional time has to be allowed for complete concrete curing after the moulds are removed before the mats can be used. Thus, the cost of producing many hundreds of these known kinds of mats required to stabilize and protect e.g., many miles of natural gas offshore pipelines are thought to be unacceptably high.

Applicants UK patent specification publication No. 2178127 discloses a method of manufacturing a flexible pipeline stabilizing and protection mat, in which there is provided a plurality of elongate tubular members closed at one end thereof. Each tubular member is formed with pairs of holes longitudinally spaced apart along its length, the holes of each pair of holes being substantially co-aligned in diametrically opposed walls of the tubular member. Lengths of flexible rope are threaded through the respective aligned pairs of holes of the tubular members which are arranged in predetermined spaced parallel relationship with each other along the ropes. The first and last tubular members of said plurality of tubular members are provided with hook means. The tubular members are then filled from their open ends with concrete which completely encapsulate and anchor the portions of rope contained within the tubular members which become a permanently retained encasement part of each of the flexibly interconnected bars formed thereby.

One object of the invention is to provide a building module or unit which is constructed to facilitate its connection or securement to like modules in end-to-end relationship and/or in side-by-side relationship.

From one aspect the invention provides a building module comprising a tubular member filled with filling material and means located in position in the tubular member and associated with an end of the tubular member for facilitating connection of the module in end-to-end relationship with another like module using a connecting means to connect the two modules.

Conveniently, the connection-facilitating means may be associated with both ends of the tubular member so as to facilitate the connection of other like modules in end-to-end relationship to either or each end of the module. In this case the connection-facilitating means may be a tube that is located in the filling material and extends longitudinally of the tubular member. The tube may be a substantially plain bore tube through which connecting means such as a pre-stressed tendon or rod can pass to connect a plurality of like modules together. Alternatively, the tube may be internally screw-threaded so as to receive externally screw-threaded connecting means to connect the module to a like adjacent module.

The connecting means may be located or fixed in position in the tubular member by being mounted from the wall of the tubular member, for example, by means of one or more support members.

Alternatively, when the filling material is one which 'sets' or hardens, the connecting means may be located or fixed in position by virtue of the connecting means being encapsulated in the set or hardened material.

From another aspect the invention provides a building module comprising a tubular member filled with filling material and a bore hole, or tube means defining a hole, which extends transversely through the tubular member and which connects two apertures provided in the wall of the tubular member to facilitate securing the module to one or more like modules in generally side-by-side relationship using securing means which passes through the bore hole or tube means in the modules.

It will be appreciated that a module may comprise both one or more said holes or tube means extending transversely through the tubular member and filling material and said connection-facilitating means so that a plurality of the modules can be linked together in generally side-by-side and/or end-to-end relationship(s) to form assemblies.

From a further aspect the invention provides a method of making a building module, wherein there is provided a tubular member, the method comprising filling the tubular member with filling material and locating in a position associated with one end of the tubular member, to form the module, means for facilitating connection of the module in end-to-end relationship with another like module. The connection-facilitating means may be located in position by being mounted from the wall of the tubular member, in which case if the filling material is non-setting or non-hardening then any openings in the tubular member via which such material could be lost are closed or plugged.

When the filling material sets or hardens, the material itself may be used to locate the connection-facilitating means in position. Moreover the transverse bore holes can be drilled or otherwise produced in the tubular member and filling material after the latter has set or hardened.

Alternatively, the tube means defining the transverse hole may be connected to two apertures provided in the wall of the tubular member prior to filling the tubular member with filling material.

The tubular members may be formed from plastics material, for example, polythene or polypropylene which has the advantages of being resistant to impact damage, and which can conveniently be cut lengths of readily available piping. When the modules are assembled into pipe stabilisation mats it is convenient if the plastics material of the members are of an easily recognisable bright colour so that the mats are more easily located in a murky environment which may be found on the sea bed. At least one of the centrally located tubular members may be of a contrasting bright colour to the remaining members so as to enable the divers to more easily manoeuvre the mat centrally over the pipeline.

The use of tubular members made of plastics material also facilitates the production of cross-sectional shapes for the finished modules more suitable for encouraging precipitation of water borne sediment to between the gaps of the modules so as to build up the sea-bed under the mat and prevent seabed scouring. For example, all or selected ones of the tubular members in a mat may be formed with one or more vanes, ribs, fins, spikes, or corners projecting outwardly from their outer surface for the purpose of generating water current vortices which causes sediment to drop between the bars.

It will be appreciated that the modules may be connected together into structural assemblies other than pipe stabilisation mats, with or without spacing between the modules.

For example, it is envisaged that the modules may be used to construct sub-sea dams to contain drill cuttings, pipe tunnels, culverts, pipe supports, large enclosed forms for containing concrete or grout, removable or permanent wall systems, fences, sign supports on roads or elsewhere, traffic control road markers, stacked to form grout bag supports for large freespan corrections on pipelines, pipe bridges, screens and baffles.

The width and length of the tubular members and their colour, the particular construction of the modules and the type and properties of the filling material would be selected in accordance with the intended application of the assembled modules.

The filling material when a setting or hardening material may, for example, be a concrete or grout, or a foam material such as foam concrete or polyurethane foam. When the filling material is a non-setting material, it may, for example, be sand, gravel or high density aggregates.

Figure 2:
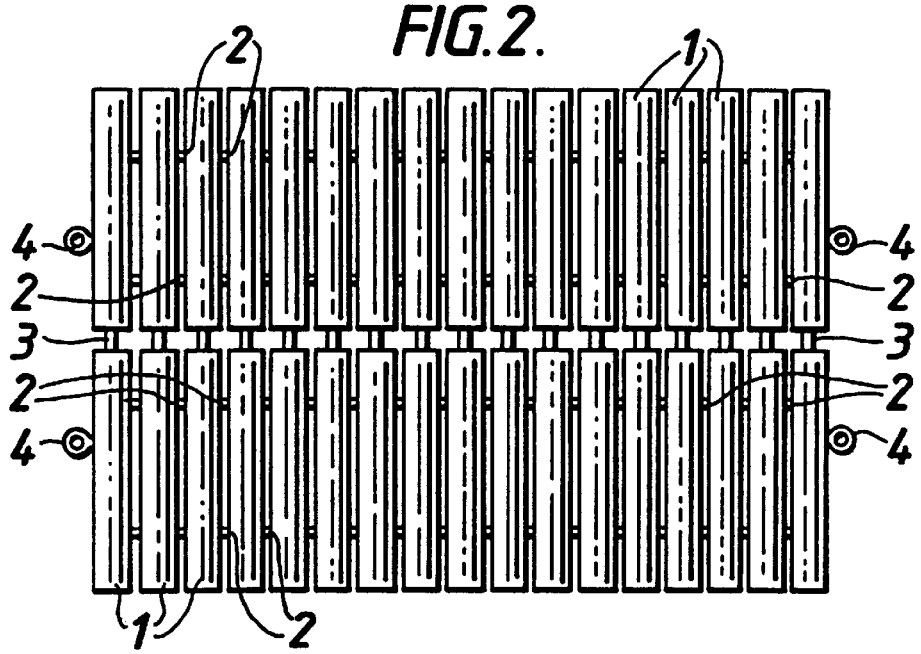
Figure 4:
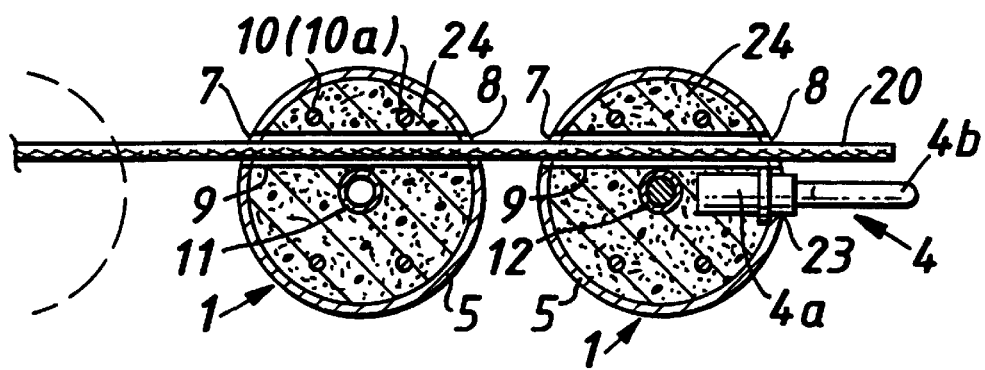

The present invention will now be described by way of example only with reference to the accompanying drawings in which;

FIG. 1 is a schematic plan view of one form of pipeline stabilising and protection mat constructed from building modules according to the invention connected together side-by-side, FIG. 2 is a similar plan view of a larger form of mat which is constructed of building modules connected together side-by-side and end-to-end, FIG. 3 is a sectional view of part of one side of the mat in FIG. 2 showing in more detail the modules and the connections therebetween, and FIG. 4 is a sectional view on the line IV—IV of FIG. 3.

Referring to FIG. 1, the mat comprises a row of elongate rigid modules 1 which are connected together in side-by-side relationship by two lengths of securing means 2.

In FIG. 2, the mat comprises two equivalent rows of elongate rigid modules 1. Each row is similar to the row shown in FIG. 1. Corresponding modules in the rows are connected together in end-to-end relationship by connection means 3.

Conveniently, the first and last modules in the rows in both FIGS. 1 and 2, are provided with hook means 4 of suitable form for connection to lifting apparatus, for example, on a supply vessel, for lifting and then lowering the mat towards a pipeline over which the mat is to be positioned.

Referring also to FIGS. 3 and 4, in the manufacture of a mat tubular members 5 formed from cut lengths of polythene piping are closed at their lower ends by fixed end caps 6 and are provided with pairs of off-centre generally opposing apertures 7, 8 formed in the walls of the tubular members. The opposing apertures in each tubular member are connected by tubes 9 for facilitating side-by-side connection of the modules. The tubes 9 are, for example, welded to the walls of the tubular members in the regions of the apertures. In cases where it is thought desirable to reinforce the modules to be made, a number of reinforcing metal rods 10 and/or a reinforcing wire cage 10a are supported by any suitable means (not shown) within each tubular member leaving a clearance from each end thereof.

Extending longitudinally and centrally through each tubular member 5 is a connection-facilitating means in the form of a straight tube 11 or 12. The ends of the tubes 11 in the tubular members are internally screw threaded as at 13 to receive externally screw threaded portions 14a of connecting means 14. Each connecting means 14 is used to connect two modules end-to-end.

The ends of the tubes 12 in the tubular members are not screw threaded. Tubes 12 are for receiving therethrough prestressed rods, wires, tendons or the like 15 which have threaded ends (not shown) and which are tightened by means of nuts 16.

Each securing means 20 consists of a length of polypropylene rope, a rod or tendon which is threaded through the appropriate tubes 9 of the tubular members which are to form each row. The tubular members 5 are positioned vertically in side-by-side relationship, e.g. in a suitable jig (not shown), so as to be spaced apart from each other. The ropes, rods or tendons 20 are passed through the aligned tubes and are then pulled and held taut or stressed in a suitable manner at each end of the row as at 21 (shown only at one end of the row).

The spacing apart of the tubular members may be determined by spacer rings 22 through which the ropes, rods or tendons 20 will also be threaded alternately with an adjacent tubular member.

Each of the hook means 4 comprises an anchoring part 4a to secure it in the aperture 23 and an eye bolt part 4b. The eye bolt 4b may be releasably attached to the anchoring part for re-use with anchoring parts of other mats.

The tubular members 5 in each row, arranged as just described and before connection to another row, are then filled from their open ends for example by pouring and vibrating a concrete mix 24 so as to completely encapsulate the tubes 9, 11, 12, the reinforcing rods 10 or wire cage 10a (where used) and the anchoring parts 4a of the hook means. The completed row or mat made up of the modules can be removed safely from the jig immediately the concrete filling has 'set' sufficiently.

When it is desired to form a mat comprising one or more further rows of modules, opposing ends of corresponding modules may be connected by connecting means 14 having threaded ends 14a which screw into the ends of the tubes 11. Alternatively, the tubes 12 in the different rows may be held in alignment, and rods or tendons 15 may then by passed through the tubes 12 and stressed and secured in position by turning nuts 16 to positions whereat they abut the remote ends of the modules.

Depending upon the overall weight of mats required for a particular application, the quantity and density of the solid aggregate used in the concrete mix may be varied both in seive sizing and material which could, for example, include iron ore fragments.

It will be understood, as mentioned earlier, that the tubular members (and thus the modules) can be assembled and connected together in various ways to produce different constructions, depending, for example, on the location of and the angles at which the tube or holes extend transversely through the tubular members and on the kind and design of the securing means and connecting means such as rods or tendons used to assemble the modules together.

I claim:

1. A building module comprising a tubular member filled with filling material and means fixedly secured in the tubular member and associated with an end of the tubular member for facilitating connection of the module in end-to-end relationship with another like module using a connecting means to connect the two modules.

2. A module as claimed in claim 1, in which the connection-facilitating means is associated with both ends of the tubular member so as to facilitate the connection of other like modules in end-to-end relationship to each end of the module.

3. A module as claimed in claim 2, in which the connection-facilitating means comprises a tube that is located in the filling material and extends longitudinally of the tubular member.

4. A module as claimed in claim 3, in which the tube is internally screw-threaded so as to receive externally screw-threaded connecting means.

5. A module as claimed in claim 1, further comprising one or more holes extending transversely through the tubular member and the filling material to facilitate securing the module to one or more like modules in side-by-side relationship using a securing means which passes through the holes in the modules.

6. A module as claimed in claim 5, in which the or each hole is defined by a tube means which connects two apertures provided in the wall of the tubular member.

7. An assembly comprising a plurality of building modules as claimed in claim 1 connected together in end-to-end relationship by connecting means linking the modules together via their connection-facilitating means.

8. An assembly comprising a plurality of building modules as claimed in claim 7 connected together in generally side-by-side relationship by securing means passing transversely through the modules.

9. An assembly according to claim 7 in which said connecting means comprise a rigid member rigidly linking the modules together.

10. An assembly according to claim 9 in which said rigid member rigidly links the modules together via screw threaded engagement with said connection-facilitating means.

11. An assembly according to claim 7 in which said connection-facilitating means comprises a tube that is located in the filling material and extends longitudinally of the tubular member.

12. A method of making a building module comprising filling a tubular member with filling material, and fixedly securing, in a position associated with one end of the tubular member, means for facilitating connection of the module in end-to-end relationship with another like module.

13. A method as claimed in claim 12, in which the connection-facilitating means is fixedly secured in position by being mounted from the wall of the tubular member.

14. A method as claimed in claim 13, in which the filling material is non-setting or non-hardening and in which the tubular member has an opening through which the filling material may pass out of the tubular member, said method further comprising closing or plugging said opening to prevent said filling material from passing out of the tubular member through said opening.

15. A method as claimed in claim 12, in which the filling material sets or hardens and thereby fixedly secures the connection-facilitating means in position.

16. A method as claimed in claim 15, in which after the filling material has set or hardened, one or more bore holes are produced that extend transversely through the tubular member and the filling material.

17. A method as claimed in claim 12 in which the connection-facilitating means comprises a tube that extends longitudinally in the tubular member to facilitate said connection at both ends of the tubular member.

* * * * *